M. P. WINTHER.
VEHICLE FRONT WHEEL DRIVING MECHANISM.
APPLICATION FILED APR. 17, 1918.

1,379,792.

Patented May 31, 1921.
3 SHEETS—SHEET 1.

Witnesses:

Inventor
Martin P. Winther
James R. Offield
Atty.

M. P. WINTHER.
VEHICLE FRONT WHEEL DRIVING MECHANISM.
APPLICATION FILED APR. 17, 1918.

1,379,792.

Patented May 31, 1921.
3 SHEETS—SHEET 2.

Witnesses:

Inventor
Martin P. Winther
James R. Offield
Atty.

M. P. WINTHER.
VEHICLE FRONT WHEEL DRIVING MECHANISM.
APPLICATION FILED APR. 17, 1918.
1,379,792.
Patented May 31, 1921.
3 SHEETS—SHEET 3.
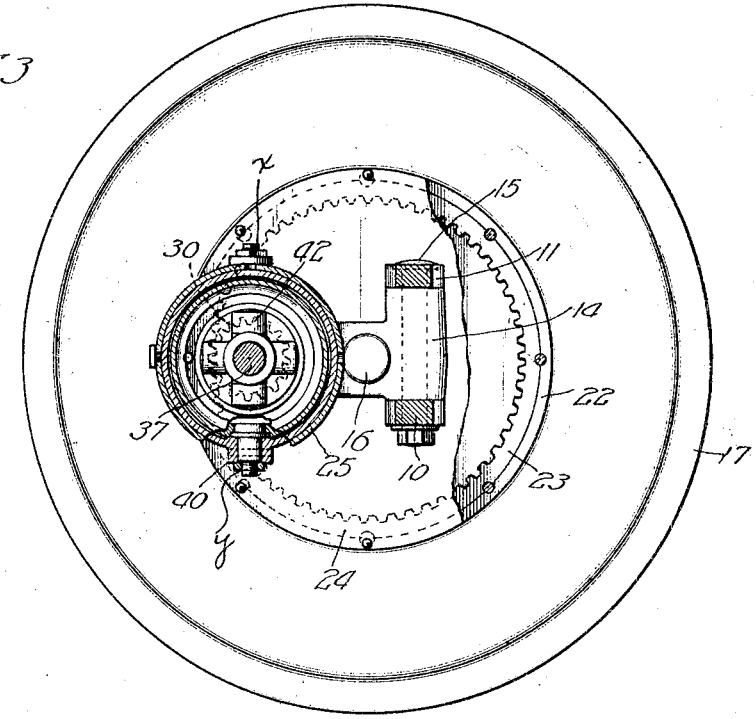
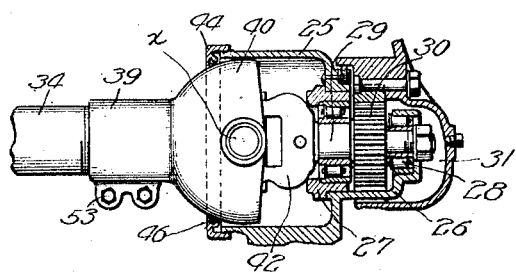
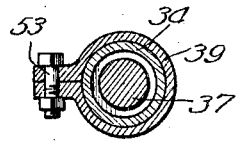
Witnesses
Arthur W. Carlson
Robert H. Weir
Inventor
Martin P. Winther
James R. Offield
Atty.

UNITED STATES PATENT OFFICE.

MARTIN P. WINTHER, OF KENOSHA, WISCONSIN, ASSIGNOR TO WINTHER MOTOR TRUCK COMPANY, A CORPORATION OF DELAWARE.

VEHICLE FRONT-WHEEL DRIVING MECHANISM.

1,379,792.  Specification of Letters Patent.  Patented May 31, 1921.

Application filed April 17, 1918. Serial No. 229,016.

*To all whom it may concern:*

Be it known that I, MARTIN P. WINTHER, a citizen of the United States, and a resident of Kenosha, in the county of Kenosha and State of Wisconsin, have invented certain new and useful Improvements in Vehicle Front-Wheel Driving Mechanism, of which the following is a specification.

My invention relates to vehicle front wheel driving mechanism and its object is to provide for the front wheels of a motor vehicle an improved and efficient driving train from the vehicle driving source, which train will also act as a tie or connection between the wheels for communicating the swing of one wheel to the other for efficient guiding of the vehicle, as such wheel is turned by operation of the vehicle steering hand wheel.

In general the construction and arrangement involved a dead, load-supporting front axle to whose outer ends the vehicle front wheels are pivoted in the ordinary manner, and a live axle structure having driving connection at its ends with the wheels and connected intermediate its ends with the vehicle driving source, one of the wheels being connected for swing by the vehicle hand steering wheel, and the live axle acting as a connecting tie structure between the wheels to communicate steering swing to the other vehicle wheel.

The various features of my invention are clearly brought out on the accompanying drawings in which—

Figure 1:
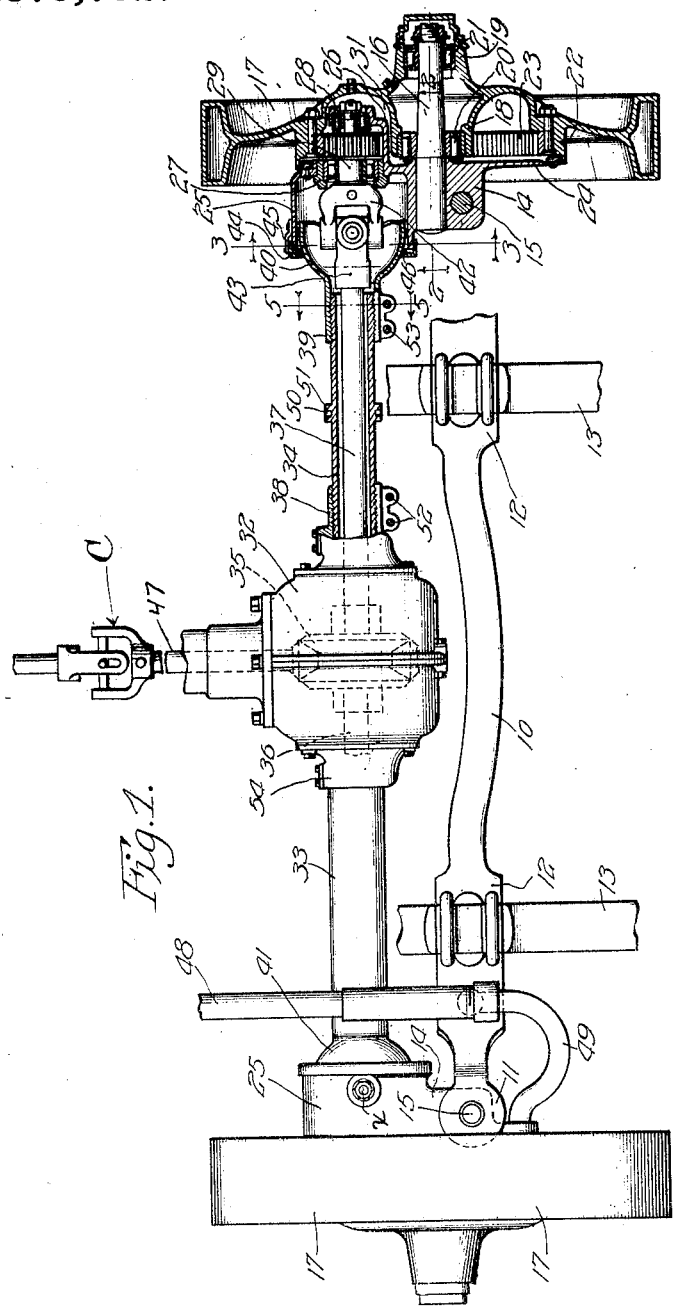
Figure 2:
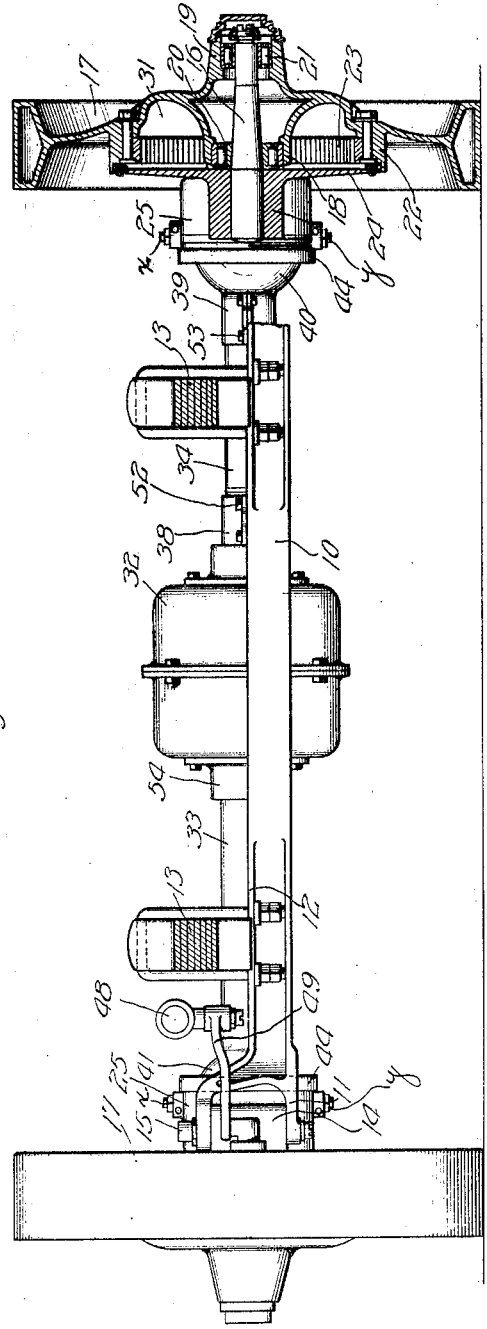

Figure 1 is a plan view of the front end of a vehicle chassis with one end thereof in horizontal diametral section, Fig. 2 is a front elevational view, partly in section, on plane 2—2, Fig. 1, Fig. 3 is an enlarged sectional view on plane 3—3, Fig. 1, Fig. 4 is an enlarged view, partly in section, showing more clearly the connection between the live driving axle and a wheel, and Fig. 5 is an enlarged sectional view on plane 5—5, Fig. 1.

The dead axle 10 has the forked ends 11, and the seats 12 for supporting the vehicle front springs 13, this dead axle receiving the vehicle load. In the forked ends 11 the frames 14 are secured by the vertical pins 15. Just in front of these pins the axle stubs 16 extend outwardly from the frames for receiving the vehicle front wheels 17. The wheels may be of ordinary construction. Those shown are of metal and have the inner and outer hub sections 18 and 19 in which the bearings 20 and 21 are supported to receive the axle 16. A flange 22 extends inwardly from the wheel web and supports the annular gear 23. The frame 14 has the circular flange 24 which fits into the inner end of the flange 22 to inclose the internal gear chamber. On each frame 14 are the inner and outer enlargements or housings 25 and 26. In the ends of the housing 26 are inserted bearings 27 and 28 for the shaft 29 on which is secured a drive pinion 30 for meshing with the internal gear 23, the wheel having the annular pocket 31 for receiving the housing 26.

To the rear of the dead axle 10 is the differential casing 32 having the tubular axial extensions 33 and 34, the casing 32 inclosing differential gear mechanism 35 and the tubular extensions inclosing the driving shaft sections 36 and 37. The tubular extension 34 has threaded engagement in the clamping sleeve 38 extending from the casing 32 and at its outer end the tube 34 threadedly receives the split sleeve 39, which sleeve is enlarged at its outer end to form a semi-spherical ball member 40 which extends into the housing 25 and is pivoted thereto by studs $x$ and $y$ (Fig. 3). The tubular extension 33 extends from the casing 32 to the spherical end 41 which extends into the housing 25 of the other wheel. Within the chamber formed by housing 25 and the ball member 40 is the universal coupling member 42 which is secured to the inner end of the shaft 29 on which the pinion 30 is mounted. At the end of the shaft section 37 the companion coupling member 43 is secured and pivoted to the coupling member 42 within the chamber of the housing. At the outer end of the shaft section 36 similar universal coupling mechanism connects the shaft with the pinion for the respective wheel. The ball members 40 and 41 are each surrounded by a ring 44 having adjustable threaded engagement with the end of the respective housing 25 and held in adjusted position by a clip 45. Each ring supports a packing 46 in engagement with the ball member to prevent the entrance of dust, dirt or moisture. In practice the shaft 47 connects with the differential mechanism 35 and drives the shaft sections 36 and 37 and thereby the vehicle wheels 17, the shaft 47 being connected with the engine or with transmission gearing.

The steering wheel (not shown) of the vehicle has connection with the rod 48 which is pivoted to the arm 49 extending from the frame 14 of one of the wheels. Upon manipulation of the steering wheel the vehicle wheel connected therewith will be swung, and the live driving axle structure comprising the differential case 32 and the tube sections 33 and 34, and the shaft sections 36 and 37 will act as a tie rod or connection between the vehicle wheels to swing both wheels when the vehicle steering wheel is turned. The location of the centers of the universal couplings 42, 43 relative to the pins 15 is such that the swing of the vehicle wheels will be relatively such that the radii of the respective paths of the wheels when the wheel is turning will be such as to prevent skidding. To permit free bodily movement of the live axle structure during swing of the vehicle wheels a universal coupling c is preferably included in the shaft 47.

In order that the vehicle wheels may be relatively true, that is, parallel when the vehicle is traveling straight ahead, the live axle structure or tie connection is adjustable. As before described, the tube section 34 has threaded connection with the differential case 32 and the ball member sleeve 39. The threading at the ends of these tube sections are in opposite directions in order that the tube member may act as a turn buckle, spanner wrench holes 50 being provided in the annular ridge 51 on the tube. When it is desired to turn the tube section to adjust the length of the tie structure the bolts 52 and 53 are first loosened to unclamp the split sleeves 38 and 39. The sleeve section 33 could be adjustable like the sleeve 34 but on the drawings it is shown integral with its ball section 41, and permanently secured to the cap 54 of the differential case 32.

I thus provide a simple yet strong, rigid and efficient driving connection for the front wheels of a vehicle which at the same time serves as a connecting rod or tie structure between the wheels to control the simultaneous steering swing thereof. The weight of the vehicle is taken up by the dead axle so that the live axle is free to properly function, and this live axle structure is situated alongside of the dead axle, thus leaving ample ground clearance for the vehicle.

I do not of course desire to be limited to the precise construction and arrangement shown and described as modifications are no doubt possible which would still come within the scope of the invention.

I claim as follows:

1. In a motor driven vehicle, the combination of a load supporting axle, wheel supporting frames mounted at the ends of said axle and provided with integral tubular extensions, a tubular member extending between said frames, the ends thereof having pivoted connection with said extensions, and a drive shaft mounted in said tubular member and extensions and having driving connection with the vehicle wheels.

2. In a motor driven vehicle, the combination of a load supporting axle, wheel supporting frames pivotally mounted on the ends of said axle, a tubular housing having pivotal connection with said frames and acting to tie the same together, a drive shaft mounted in said housing, and having driving connection with said wheels, and means for adjusting the length of said tubular housing.

3. In a motor driven vehicle, the combination of a load supporting axle, wheel supporting frames pivotally mounted at the ends of said axle, a tubular housing extending between and having pivotal connection with said frames, a drive shaft mounted in said tubular housing and having driving engagement with said wheels, and flexible joints in said drive shaft located adjacent the pivotal connections between said tubular housing and frames.

4. In a motor driven vehicle, the combination of a load supporting axle, wheel supporting frames pivotally mounted on the ends of said axle, a tubular housing extending between and having pivotal connection with said frame members, a drive shaft journaled in said tubular housing and said frame members, and having driving engagement with said wheels, there being provided in said drive shaft a universal joint adjacent said pivotal connection, and steering mechanism connected with one of said wheel supporting frames.

5. In a motor driven vehicle, the combination of a load supporting axle, a frame pivoted to each end of said axle, a wheel rotatable on each frame to be swung therewith for steering purposes, a transmission train mounted on each frame and the corresponding wheel, a drive shaft structure having flexible connection at its ends with said transmission train and adapted to be driven from the vehicle driving source, and an inclosed housing surrounding said drive shaft structure and extending into said frame, said drive shaft structure and housing serving to communicate steering swing of one wheel to the other wheel.

6. In a motor driven vehicle, the combination of a load supporting axle, a frame pivoted to each end of said axle, a wheel rotatable on each frame to be swung therewith for steering purposes, a transmission train mounted on each frame and the corresponding wheel, a drive shaft structure having flexible connection at its ends with said transmission train and adapted to be driven from the vehicle driving source, and a housing inclosing said drive shaft structure and having ball and socket connection with said frames, said drive shaft structure and housing serving to communicate steering swing from one wheel to the other.

7. In a motor driven vehicle, the combination of a load supporting axle, a frame pivoted to each end of said axle, a wheel rotatable on each frame to be swung therewith for steering purposes, a transmission train mounted on each frame and the corresponding wheel, a drive shaft structure having flexible connection at its ends with said transmission train and adapted to be driven from the vehicle driving source, a housing surrounding said shaft structure and having ball and socket connection with said frames, said driving shaft structure and housing serving to communicate steering swing from one wheel to the other, and means for longitudinally adjusting said housing.

8. In a motor driven vehicle, the combination of a load supporting axle, a frame pivoted to each end of said axle, a wheel rotatable on each frame to be swung therewith for steering purposes, an inner and an outer cylindrical enlargement on each frame forming housings, each wheel having an annular pocket for receiving the outer housing of the corresponding frame, a drive shaft structure parallel with the vehicle axle and extending into the inner enlargement of said frames, a housing surrounding said drive shaft structure and having ball and socket connection at its ends with said inner enlargement, pinions at the ends of said drive shaft structure located in the outer enlargements of said frames, and gears on said wheels meshing with said pinions.

In witness whereof, I hereunto subscribe my name this 12th day of April, A. D. 1918.

MARTIN P. WINTHER.